(12) United States Patent
Jackson, III et al.

(10) Patent No.: US 12,424,831 B1
(45) Date of Patent: Sep. 23, 2025

(54) SYSTEMS, ASSEMBLIES, COMPONENTS, AND METHODS FOR REMOVING INGROUND UTILITY POLES

(71) Applicants: Denton L. Jackson, III, Coldwater, MS (US); Todd A. Egan, North Palm Beach, FL (US)

(72) Inventors: Denton L. Jackson, III, Coldwater, MS (US); Todd A. Egan, North Palm Beach, FL (US)

( * ) Notice: Subject to any disclaimer, the term of this patent is extended or adjusted under 35 U.S.C. 154(b) by 0 days.

(21) Appl. No.: 18/813,446

(22) Filed: Aug. 23, 2024

Related U.S. Application Data

(60) Provisional application No. 63/648,687, filed on May 17, 2024.

(51) Int. Cl.
*E04H 17/26* (2006.01)
*A01G 23/06* (2006.01)
(Continued)

(52) U.S. Cl.
CPC ............... *H02G 1/02* (2013.01); *E02D 9/02* (2013.01); *E04H 12/348* (2013.01);
(Continued)

(58) Field of Classification Search
CPC .. E02D 9/02; E02D 7/04; E02D 13/00; E04H 17/265; E04H 17/263; E04H 12/348;
(Continued)

(56) References Cited

U.S. PATENT DOCUMENTS 1,805,381 A * 5/1931 Shimko ................... E21D 15/60
254/131
1,983,749 A * 12/1934 Garrick .................. E21B 19/06
254/30
(Continued)

FOREIGN PATENT DOCUMENTS

| AU | 2020201534 A1 * | 9/2020 | |
|----|----|----|----|
| CN | 108999189 A * | 12/2018 | ............... E02D 9/02 |
| CN | 111733814 A * | 10/2020 | ............... E02D 9/02 |

OTHER PUBLICATIONS

Slingco 10K Drive Wrench Assembly Found at: https://www.youtube.com/watch?v=v0Z1WZNqjWI&t=20s (Year: 2021).*

*Primary Examiner* — Mahdi H Nejad
(74) *Attorney, Agent, or Firm* — Fantastic IP Consulting; Eduardo E. Drake

(57) ABSTRACT

The electric power industry has long standing practices for removal of aged and damaged utility power poles, which are not only time consuming, but unsafe for workers. To address this, the present inventors devised better methods, some of which entail cutting off the top portion of an inground utility pole to produce a pole butt, rotating the inground pole butt about its vertical axis to free the pole from the grip of the surrounding earth, and applying a lifting force to the pole butt during and/or after the rotation. Some embodiments implement the method using a rotary coupler, which couples a rotary drive via one or more pole collaring devices and/or one or more pole penetrating devices, to the pole butt, (Continued)

reducing pole butt removal time by at least half according to some estimates, while also improving safety.

9 Claims, 7 Drawing Sheets

(51) Int. Cl.
*E02D 9/00* (2006.01)
*E02D 9/02* (2006.01)
*E04H 12/34* (2006.01)
*H02G 1/02* (2006.01)
*A01G 17/16* (2006.01)

(52) U.S. Cl.
CPC ......... *E04H 17/263* (2013.01); *E04H 17/265* (2013.01); *A01G 17/16* (2013.01)

(58) Field of Classification Search
CPC ........ A01G 17/16; A01G 23/065; B25D 1/16; A01B 1/16; B25B 27/02; H02G 1/02
USPC ....... 254/30, 132, 133 R; 144/24.12; 37/302; 414/23
See application file for complete search history.

(56) References Cited

U.S. PATENT DOCUMENTS

| | | | | |
|---|---|---|---|---|
| 4,256,286 A * | 3/1981 | Hudgins | ................ | E04H 17/265 254/30 |
| 4,422,621 A * | 12/1983 | Ekern | ................... | E04H 17/265 294/102.1 |
| 5,675,851 A * | 10/1997 | Feathers | ................. | A61G 13/12 5/601 |
| 6,367,779 B1 * | 4/2002 | Martin | .................... | B25B 27/02 254/250 |
| 6,857,619 B1 * | 2/2005 | Jangula | .................... | E02F 3/96 254/132 |
| 8,608,132 B1 * | 12/2013 | Allen | ..................... | E04H 17/26 254/130 |
| 10,024,019 B1 * | 7/2018 | Hunter | ................... | E02D 5/56 |
| 2002/0063245 A1 * | 5/2002 | Salman | ................. | E04H 17/265 254/30 |
| 2007/0181320 A1 * | 8/2007 | Mason | .................... | B25D 1/16 173/90 |
| 2011/0008111 A1 * | 1/2011 | Jinnings | ................... | E02D 5/04 405/232 |
| 2020/0080340 A1 * | 3/2020 | Sanchez | ................. | B25B 27/02 |
| 2023/0220700 A1 * | 7/2023 | Davis | ................... | E04H 17/265 254/30 |

* cited by examiner

SYSTEMS, ASSEMBLIES, COMPONENTS, AND METHODS FOR REMOVING INGROUND UTILITY POLES

RELATED APPLICATION

The present application claims priority to U.S. Provisional Patent Application 63/648,687 filed May 17, 2024, which is incorporated herein by reference in its entirety.

TECHNICAL FIELD

The present invention concerns devices and methods for removing electric utility poles from the ground.

A portion of this patent document contains material subject to copyright protection. The copyright owner has no objection to the facsimile reproduction by anyone of the patent document or the patent disclosure, as it appears in the patent and trademark office patent files or records, but otherwise reserves all copyrights whatsoever. The following notice applies to this document: Copyright © 2024, DENTON L. JACKSON III AND TODD A. EGAN.

BACKGROUND

The electric power industry is a fundamental part of our modern civilization, providing the vital energy needed for a vast array of residential, commercial, and industrial activities. The industry relies heavily on an extensive network of overhead power lines supported by wooden and metal poles, upwards of 180 million in the U.S. alone, according to some estimates. Over time, these poles deteriorate due to environmental factors, physical damage, or simply age, necessitating their removal and replacement to ensure the reliability and safety of the power supply.

Typically, the removal of these poles is a complex and dangerous task, most commonly achieved using pole jacks and utility trucks. Pole jacks, which are hydraulic jacks equipped with a pole gripping chain, are placed at the base of a pole to lift it sufficiently to break the grip of the surrounding earth on the pole. Once freed from the earthen grip, workers use a hydraulic boom arm on a specialized utility truck, known as a digger derrick, to fully remove the pole from the ground and place in a desired location.

Although this practice has been the gold standard in the industry for decades, the present inventors have recognized it suffers at least two problems. Firstly, in practice, setting up the pole jack is cumbersome and time consuming. The pole jack itself weighs over two hundred pounds and must be carried by workers from the truck to the pole site, manually leveled on the ground, and then coupled to the pole before lifting. Moreover, repeated cycles of coupling and decoupling of the jack to and from the pole are typically needed, before the boom arm can be used to safely complete removal. Secondly, the pole jack is not always successful in fully freeing the pole, leading workers to use the boom to lift loads beyond its capacity and/or to rock the pole back and forth to free it. Unfortunately, this rocking can lead to unpredictable pole movements, putting workers at risk of injury and death from falling pole debris or sudden shifts in the pole position. The strain and stress on the booms can also lead to mechanical failures or damage to the trucks, resulting in costly repairs and downtime. Moreover, this rocking practice may breach the truck warranty and violate worker safety protocols.

Accordingly, the present inventors have recognized a need for better ways of removing utility poles from the ground.

SUMMARY

To address one or more of these and/or other needs or problems, the present inventor devised, among other things, one or more exemplary systems, kits, methods, devices, assemblies, and components for removing utility poles or portions thereof from surrounding ground.

Some of the exemplary methods entail cutting off the top portion of an inground utility pole to produce a utility pole butt (or pole stump), rotating the inground pole butt at least a number of aggregate degrees about its vertical axis to free the pole from the grip of the surrounding earth, and applying a substantially vertical lifting force to the pole butt during and/or after rotating the pole butt. In some embodiments, the pole butt is rotated an aggregate or cumulative rotational angle of at least 5, 10, 15, 20, 25, 30, 35, 45, 90, 135, 180, 270, 360, 720, 1080, 1440, or 1800 degrees. In some embodiments, the pole is only rotated in one direction, for example, clockwise or counterclockwise to achieve the desired cumulative rotation, and in others the cumulative rotation is achieved by rotating it back and forth (for example, clockwise and counterclockwise) in the two directions, with each rotation contributing to the aggregate rotation. In some embodiments that rotate the pole butt back and forth, the angle of rotation in the two directions are equal, and in others they are not. In some embodiments, the pole is effectively rotationally vibrated in place.

In some embodiments, the method is implemented using a utility truck in combination with means for coupling the inground utility pole butt to a rotary drive, means for coupling the butt to a lifting arm of a power utility truck, and means for automatically and/or manually controlling the rotary drive and/or the lifting arm. In some embodiments, the means for coupling the butt to the rotary driver includes a Kelly bar adapter that is mounted to at least one wedge or bladed structure. The adapter couples to the rotary driver via a drive shaft, and the wedge or bladed structure has one or more wedges or blades driven into the butt, for example its top or side or both its top and side. Some embodiments augment or replace the penetrative coupling using one or more choke chains cinched around a top exterior surface of the pole butt, with the chains configured to tighten their grip on the pole butt as the rotary drive rotates. And still other embodiments use both axial and radial coupling, or more generally, top transverse (that is transverse to the top surface of the pole butt) and transverse to the axis of the pole butt.

One or more of these and/or other embodiments are further represented and taught in the following drawings, description, and claims.

BRIEF DESCRIPTION OF THE DRAWINGS

Various embodiments are described herein with reference to the following attached figures (FIGS.). These figures are annotated with reference numbers for various features and components, and these numbers are used in the following description as a teaching aid, with like numbers referring to the same or similar features and components.

DESCRIPTION OF EXEMPLARY EMBODIMENTS

This document, which incorporates drawings and claims, describes one or more specific embodiments of one or more inventions. These embodiments, offered not to limit but only to exemplify and teach the invention, are shown and described in sufficient detail to enable those skilled in the art to implement or practice the invention(s). Thus, where appropriate to avoid obscuring the invention(s), the description may omit certain information known to those of skill in the art.

Figure 1:
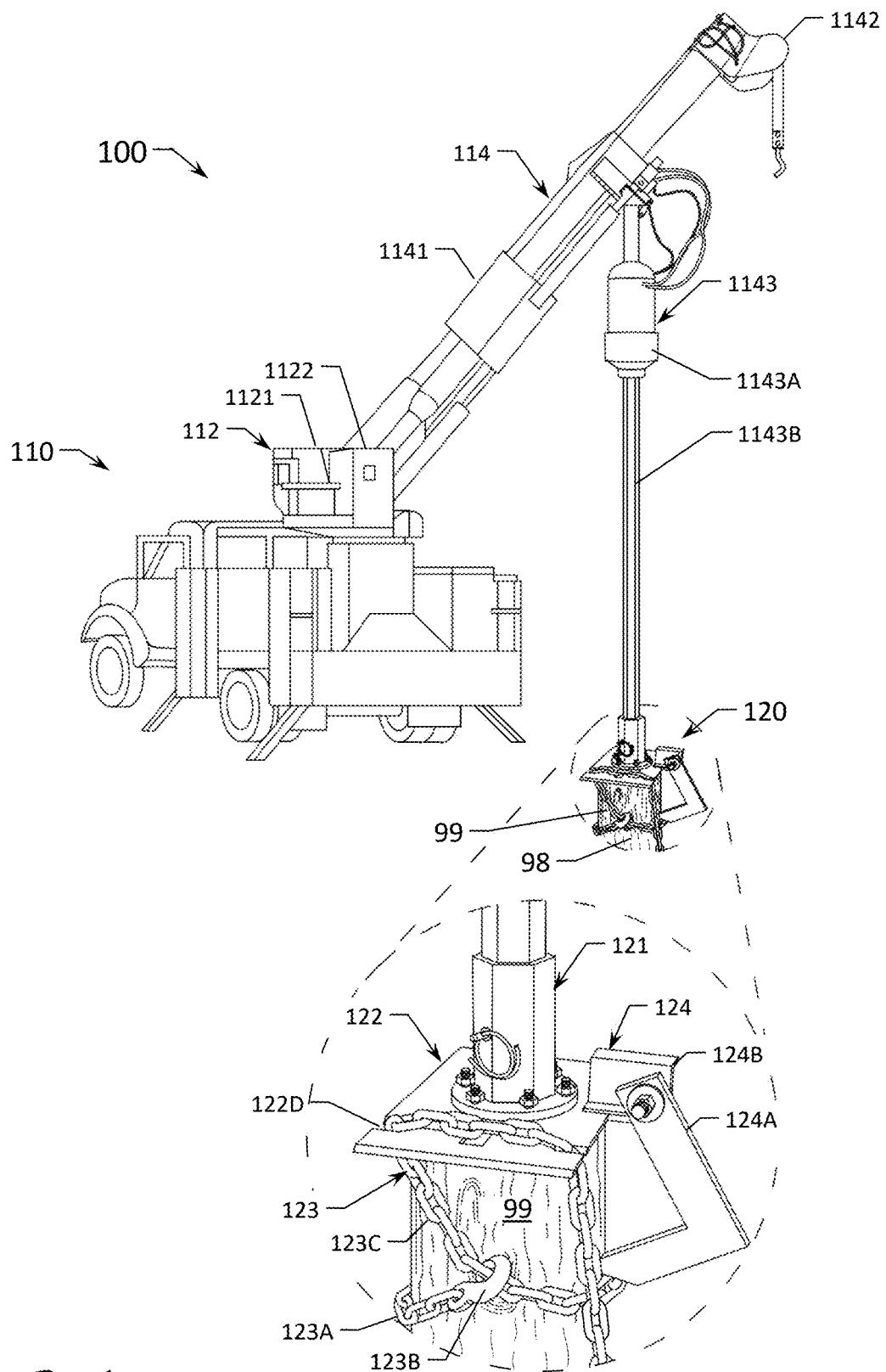
FIG. 1 is a perspective view of an exemplary utility pole removal system 100, corresponding to one or more embodiments of the present invention.
Figures 1A, 1B:
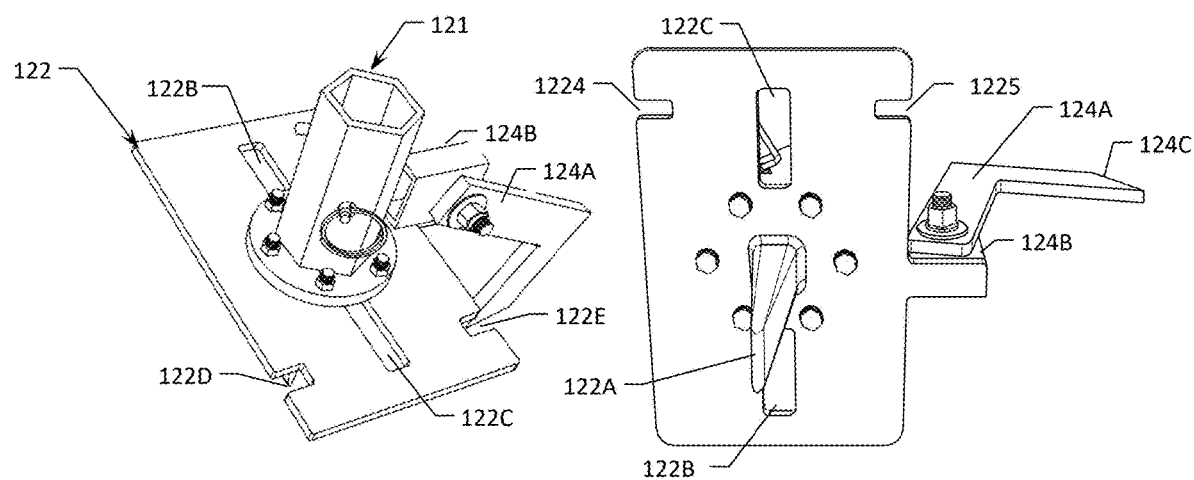
FIG. 1A is a top perspective view of the pole butt coupling assembly portion of system 100, corresponding to one or more embodiments of the invention.
FIG. 1B is a bottom perspective view of the pole butt coupling assembly portion of system 100, corresponding to one or more embodiments of the invention.

FIG. 1 shows a utility pole removal system or assembly 100 coupled to an inground metal or wooden utility pole butt 99 which exists in surrounding ground 98. System 100 includes a digger derrick utility truck 110 and a pole coupling assembly 120.

Digger derrick utility truck 110 includes, among other things, an operator control cockpit 112 and a boom arm 114. Control cockpit 112, which is typically, though not necessarily mounted to a rear area of the truck, includes an operator seat 112A and manual and/or semi-automated controller 112B for positioning and controlling boom arm assembly 114. Boom arm assembly 114, which is conventionally extendable via hydraulic and/or motorized actuators, includes, among other things, a retractable boom arm 1141 having a motorized wench assembly 1142 at its far end, and a rotary drive assembly 1143 extending from the boom arm, between the wench assembly and the control cockpit. Rotary drive assembly 1143 includes a rotary driver 1143A, for example, an auger motor, and a drive shaft 1143B extending from it. In some embodiments, the drive shaft takes the form of a hexagonal (hex) shaft or Kelly bar. The far or lower end of the drive shaft is mechanically coupled to rotate pole coupling assembly 120.

Pole coupling (or clutching) assembly 120, which is configured to mechanically couple with the above ground portion of pole butt 99, includes a rotary drive coupler 121, wedge or blade plate 122, and a pole chain or cinch assembly 123. Rotary drive coupler 121, which in some embodiments takes the form a Kelly bar adapter or hex shaft adapter axially couples to drive shaft 1143B, permitting rotation of the drive shaft to drive rotation of the coupler and the wedge plate 122 in unison. In some embodiments, an upper portion of the coupler is secured to the drive shaft via a pin and to the wedge plate via one or more bolts or via a weld joint. Some embodiments may form the wedge plate and the drive coupler as a singular casted, machined, or additively manufactured (3D printed) part. Wedge plate 122, shown in greater exemplary detail in FIGS. 1A, 1B, 1C, and 1D, includes a rectangular steel plate mounted not only to coupler 121, but also a set of one or more wedges or blades, for example wedge 122A, extending from its lower major surface. The wedges or blades, which in some embodiments takes the form of 4-pound steel wedges, are positioned to allow for transverse (for example generally perpendicular) insertion into a top surface 99A of pole butt 99. In some embodiments, one or more of the wedges or blades take the form of a square head wood splitting wedge ranging in weight from 3-8 pounds, with an approximate length in the range of 7-11 inches, and a taper in the range of 8-14 degrees. Some specific embodiments use a 4-pound wedge having a taper in the range of 10-12 degrees. In some embodiments, the wedges provide a generally unified axial coupling of the wedge plate to the butt, allowing application of torque generated from the rotary drive and transferred via the drive shaft and drive shaft coupler to rotate the pole butt. (Some embodiments configure one or more of the blades in a helical or spiral form factor.) Some embodiments provide plate 122 with blade or stake holes or slots 122A and 122B through which stakes, bars, or other wedge or blade members, such as pole stake 125 in FIG. 1D, can be inserted and hammered into the top surface of the pole butt, further enhancing the physical coupling of the butt to the wedge plate and the rotary drive.

FIG. 1 shows that the wedge plate is also secured to the pole stump via pole chain or cinch assembly 123. Chain assembly 123 includes a multilink chain or strap 123A that encircles the pole butt in an interference or friction fit. More specifically, assembly 123A includes a hook 123B that interlocks with one or more links of the chain to complete encirclement of the pole butt, and a plate-linking portion 123C that wraps over the wedge plate and interlocks with notches 122D and 122E. In operation, the interlock with notches 122D and 122E links the chain with the wedge plate, such that rotation of the plate tends to tighten grip of the chain assembly around the pole butt. (Some embodiments may include additional notches, for example on adjacent or opposite sides of the wedge plate.) Moreover, this tightening or constriction from the outer cylindrical surface of the pole butt toward its central vertical axis (inward radial direction) is in opposition to outward radial expansion of the pole butt caused by insertion of the wedge(s) from the wedge plate into the top surface of the pole butt. In other words, these wedges, indeed other forms of pole butt penetration, particularly in axial or longitudinal dimension of the pole butt, effectively expands or enlarges the butt head, whereas the pole chain or cinch encircling the butt tightens around the expanded butt head during rotation due to the direction of rotation. The combined effects of the butt head enlargement and the radial compression are particularly advantageous in facilitating removal of butts that are softer due to rot or other disintegrating damage. To further enhance the radial compression some embodiments also include a rachet or cam lock lever mechanism in the strap or chain.

FIGS. 1 and 1A-1C show yet that some embodiments of pole coupling assembly 120 include a lateral hook assembly 124 having an L-shaped hook 124A pivotally mounted to a vertical flange 124B extending from the top surface of the wedge plate. Hook 124A includes an upper vertical portion pivotally coupled to the flange and a horizontal or lateral portion having a pointed or bladed end 124C (best shown in FIG. 1C). The pointed end can be hammered into the side or lateral surface of the pole butt to further enhance coupling of the butt of the wedge plate assembly and rotary drive.

Exemplary Method(s) of Operation

Figure 2:
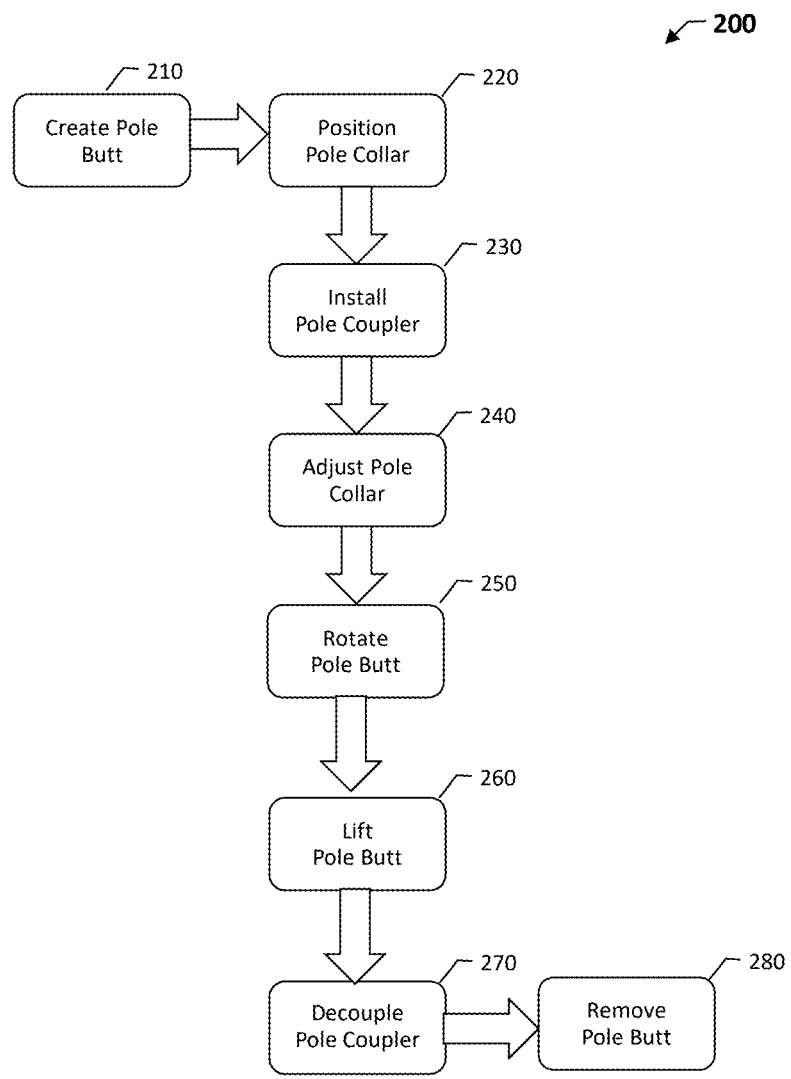
FIG. 2 is a flow chart of an exemplary pole removal method, corresponding to one or more embodiments of the invention.

FIG. 2 shows a flow chart 200 of one or more exemplary methods of operating a power utility pole removal system, such as system 100. Flow chart 200 includes blocks or steps 210-280, which are arranged and described as a sequence in the exemplary embodiment for sake of explanatory clarity and concision. However, other embodiments may change the order of two or more of the blocks or execute two or more of the blocks in parallel, for example the rotating and lifting in respective blocks 250 and 260. Some embodiments may also omit one or more of the blocks or steps. For example, some may use either the axial or the radial (lateral) coupling of the butt to the rotary drive, but not both. Moreover, one or more aspects of the method may be fully or partially automated using robotic and/or programmatic components and/or artificial learning algorithms and thus embodied as machine executable instructions stored within the memory of hardware modules responsive to and/or generative of related control and data signals communicated between and through the modules. Thus, the exemplary process flow applies to manual, semi-automatic, and automatic implementations using a variety of hydraulic, pneumatic, and electric implementations, some of which may include software, hardware, and firmware implemented control logic.

At block 210, the exemplary method begins with identifying and/or creating a pole butt, such as pole butt 99 shown in FIG. 1. In some embodiments, this entails locating an existing inground wooden or metal utility pole, de-energizing the electrical and/or other lines attached to the pole, and then and cutting a top portion of the pole approximately 10-20 inches, for example 13 inches above the ground. Exemplary execution then continues at block 220.

Block 220 entails at least partially collaring the butt. In some embodiments, this entails encircling the pole with a steel chain or other form of adjustable cinch, such as a choke chain. Some embodiments may use other types or configurations of circumferential collars or grips. Execution then proceeds to block 230.

Figures 1C, 1D:
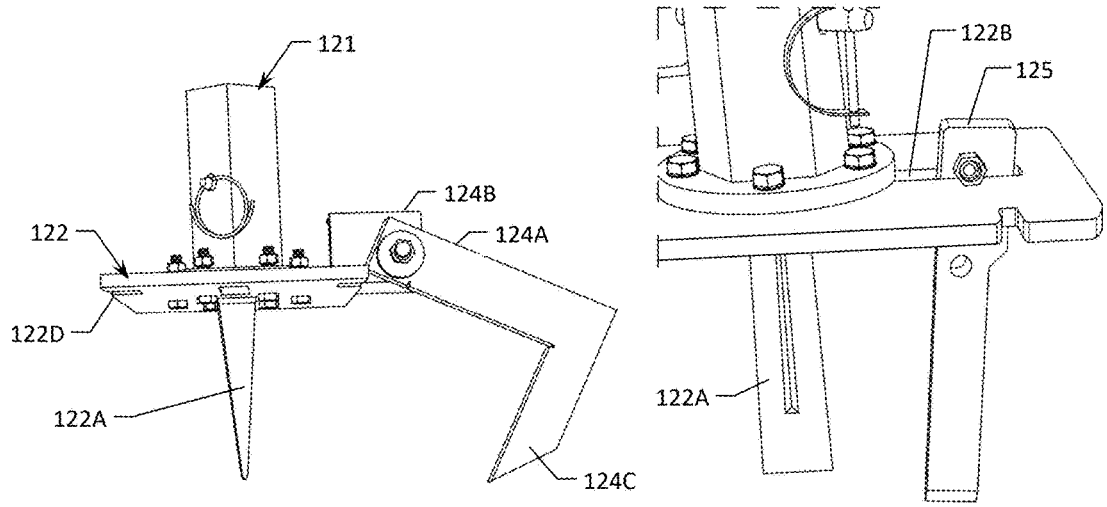
FIG. 1C is a left side view of the pole butt coupling assembly portion of system 100, corresponding to one or more embodiments of the invention.
FIG. 1D is a front view of the pole butt coupling assembly portion of system 100, augmented with an additional axial coupling stake and corresponding to one or more embodiments of the invention.

Block 230 entails axially coupling the butt to a rotary drive assembly. In some embodiments, this entails positioning a digger derrick truck or more precisely the boom of the digger derrick over the pole butt, aligning the auger arm portion of the boom with the butt, and attaching the auger rotary drive shaft to a bladed or wedged structure, such as wedge plate 12X, via a hex shaft adapter (for example, Kelly bar adapter.). Next, the boom arm is then manipulated automatically or via manual control to axially align one or more of the wedge or blade members of the bladed structure over the top face of the butt. Once aligned, the boom arm is used to push or drive the wedge blade(s) into the top face, establishing the axial coupling of the butt to the rotary drive. In some embodiments, one or more additional wedges or blades, such as stake 150 in FIG. 1D, are driven through holes in the wedge plate into the top of the butt, strengthening the axial coupling between the rotary drive and the butt. Execution continues at block 240.

Block 240 entails ensuring circumferential attachment of the pole coupling assembly to the pole butt. In some embodiments, this entails fitting one or more links of the pole chain into one or more notches of the wedge plate and/or using a rachet or cam lever to tighten the chain around the pole and wedge plate. Some embodiments may also nail or pin one or more links of the chain to the pole butt.

Block 250 entails rotating or spinning the pole a desired aggregate rotational angle abouts its vertical axis. In some embodiments, this entail operation of the rotary drive via available electromechanical controls to rotate the butt an aggregate or cumulative rotational angle of at least 5, 10, 15, 20, 25, 30, 35, 45, 90, 135, 180, 270, 360, 720, 1080, 1440, or 1800 degrees. In some embodiments, the pole is only rotated in one direction, for example, clockwise or counterclockwise to achieve the desired cumulative rotation, and in some others, the cumulative rotation is achieved by rotating it back and forth (for example, clockwise and counterclockwise) in the two directions, with each rotation contributing to the cumulative rotation. In some embodiments that rotate the pole butt back and forth, the magnitude of the angle of rotation in the two directions are equal, and in others they are not. In some embodiments, the pole is effectively rotationally vibrated in place at a desired frequency, for example clockwise and counterclockwise 1, 5, 10, 15, or 20 degrees at a frequency in the range of 1, 2, 5, 10, or 20 cycles per second, per 5 seconds, per 10 seconds, or per minute. Exemplary execution continues at block 260.

Block 260 entails lifting the pole butt to ensure its release or liberation from the surrounding ground. In some embodiments, this lifting entails using the boom arm of the digger derrick to lift the entire assembly of the boom arm, the rotary drive, the pole coupling, and the pole butt a desired distance, for example, approximately 1, 2, 3, 4, or 5 feet vertically, measured from the starting height of the top surface of the pole butt to the finished height of the lift. In some embodiments, the lifting may be executed concurrently with the rotation of the butt or some period of time, for example, 5, 10, 15, or 20 seconds after rotation of the of the butt has started, and/or to discontinue the rotation a period of time after the lifting has started or reached a predetermined height. Some embodiments may include one or more rotational position sensors to monitor the cumulative rotation of the butt. Additionally, some embodiments may also include sensors for determining the load on the rotary drive, for example torque or electric current sensors, to shutdown the rotary drive in the event of overload to protect workers and the rotary drive. Execution continues at block 270.

Block 270 entails removing the pole butt. To this end, some embodiments lower the pole butt after it is lifted to the desired height to a resting position within the hole created by its rotation and lifting to release tension in the pole chain. With tension released, the pole chain is disconnected manually or automatically from the pole butt and the wedge plate assembly is rotated, for example, 30, 45, or 90 degrees to facilitate separation of the entire wedge plate assembly, particularly its wedge or blade members, from the pole butt. Next, the pole chain or other attachment may be coupled to the boom arm wench to complete removal of the pole butt.

Figures 3, 3A:
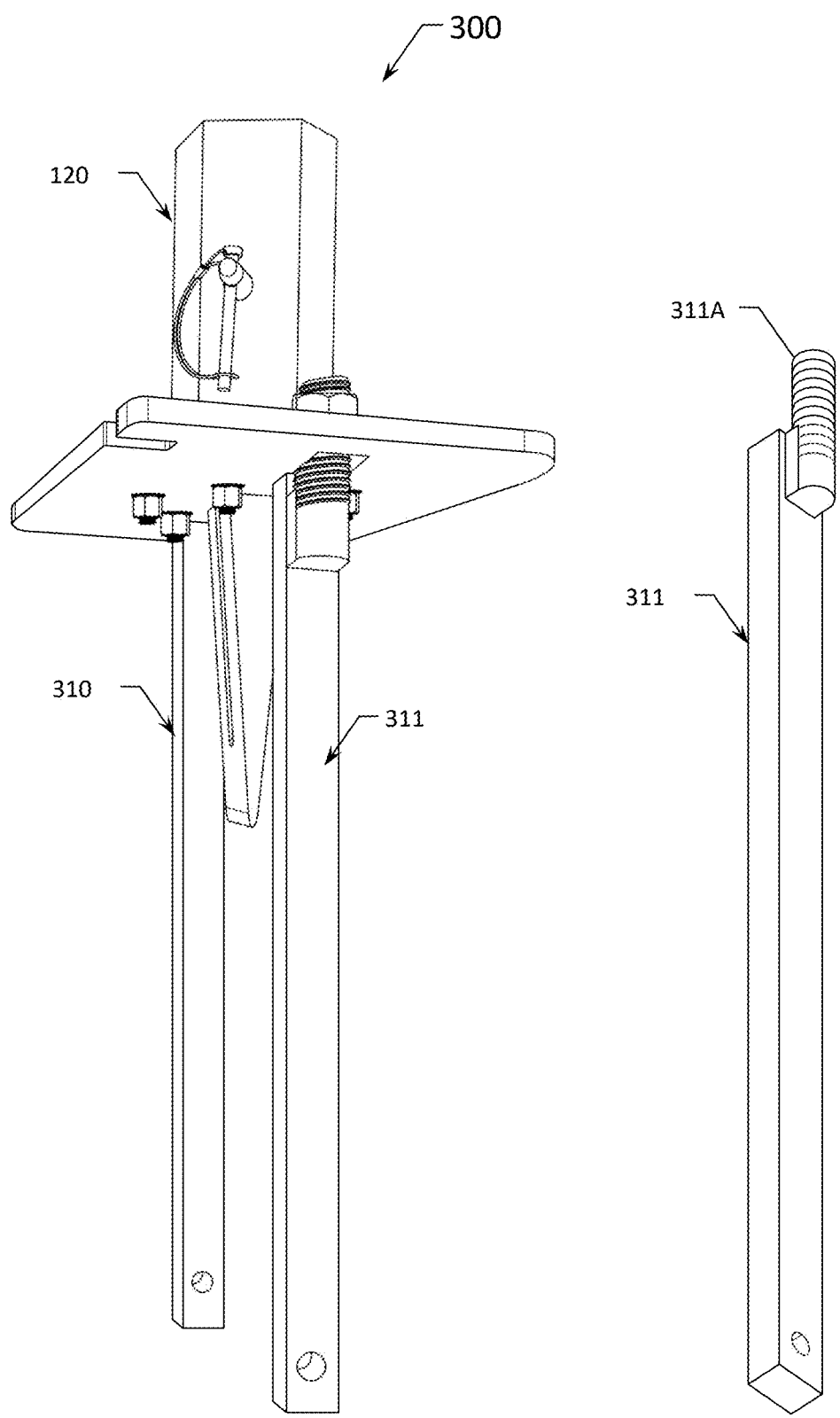
FIG. 3 is a perspective view of an exemplary pole butt coupling assembly 300, corresponding to one or more embodiments of the invention.
FIG. 3A is a perspective view of a component of assembly 300, corresponding to one or more embodiments of the present invention.

FIG. 3 shows a pole removal assembly 300, an alternative embodiment of the pole butt coupling assembly 120, which includes one or more vertical arms, such as vertical arms 310 and 311 extending through slots 122B and 122C and downward from wedge plate 122. During rotation of the wedge plate these arms which extended into the ground surrounding the pole butt cut into the surrounding ground, further weaking the grip or adhesion of the ground on the pole. Each of the arms, which are substantially identical in some embodiments, includes a offset and threaded bolt portion 311A (shown best in FIG. 3A), which allows the arm to be bolted to wedge plate 122.

Figure 4:
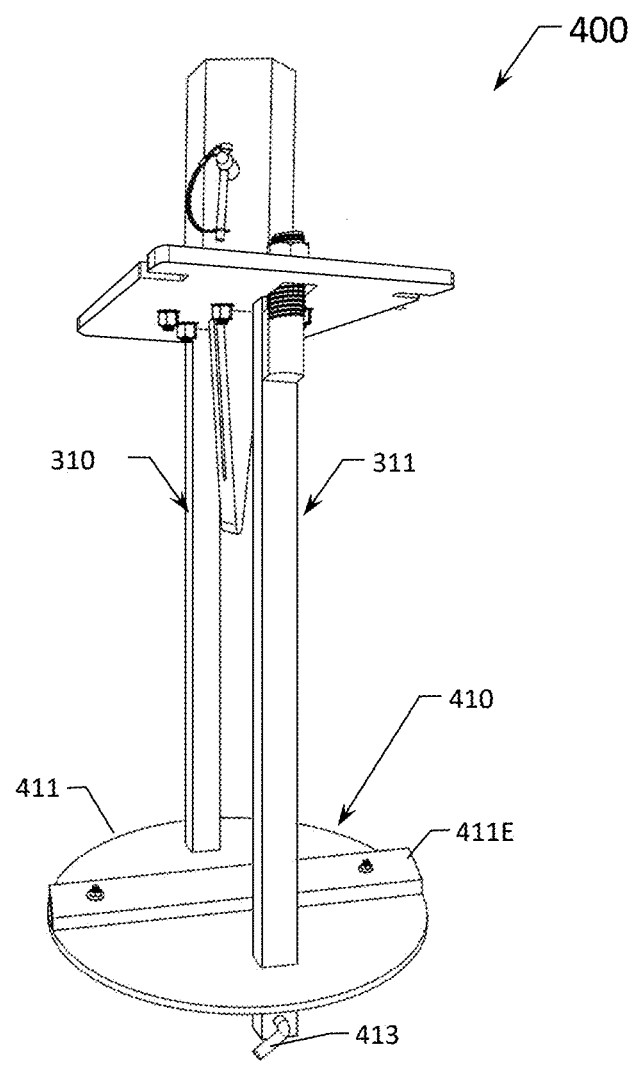
FIG. 4 is a perspective view an exemplary cable winding assembly 400, corresponding to one or more embodiments of the invention.
Figure 4A:
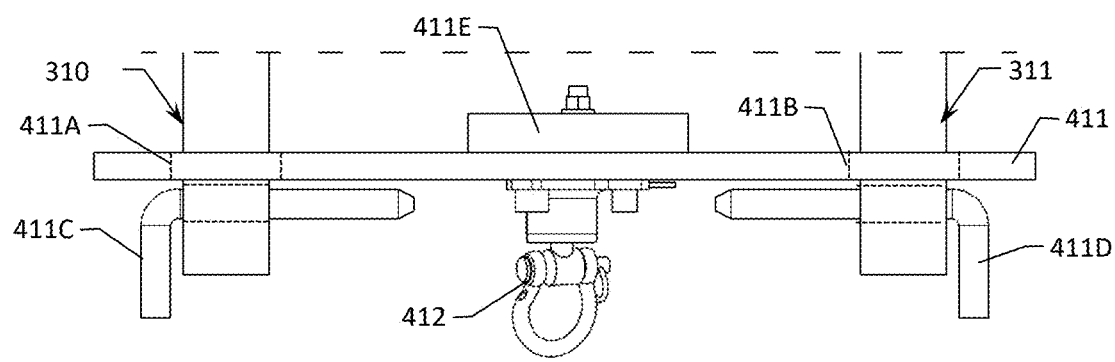
FIG. 4A is a profile view of a portion of the assembly 400, corresponding to one or more embodiments of the invention.

FIG. 4 shows a further extension of pole coupling assembly 300 into a cable winding assembly 400, via addition of a winding plate adapter 410. Adapter 410 includes a base plate assembly 411 and a stabilizer coupling 412. Base plate 411 attaches to the ends of vertical arms 310 and 311, with the arms extending respectively through slots 411A and 411B in the base plate portion, which is secured in place via respective pins 411C and 411D, shown best in FIG. 4A. Spacer bar 411E, for example a wooden plank mounted to the top of the plate, extends diametrically across the plate midway between the vertical arms, providing a resting place for cable and tie wire (both not shown). Mounted to the central underside portion of the base plate is stabilizer coupling 412, for example a swivel hook or eyelet, The swivel coupling can be coupled via a cable or line to a stabilizing weight, ground stake, or other object (not shown).

In operation, one or more tie wires, for example two or three, are laid across the spacer bar and an end portion of a wire, rope, or fiber optic cable is attached to or loop around one of the vertical arms. The rotary drive is then operated to rotate the wedge plate, causing the wire, rope, or cable to wrap or spool around the vertical arms. During this rotation, the stabilizer weight or stake reduces wobbling of the winding spool made by addition of the winding plate adapter, maintaining relative verticality of the winding assembly, for example, at an absolute angle in the range of 80-90 degrees with the horizontal, and thus ensuring a smoother and safer winding operation. When winding is complete, rotation is stopped and the one or more tie wires are tied to secure the wound position of the cable. Then the pins securing the base plate to the two arms, allowing the base plate and the wound cable to separate from the remainder of the assembly. The roll of wound cable can then be handled and transported as desired.

Figure 5:
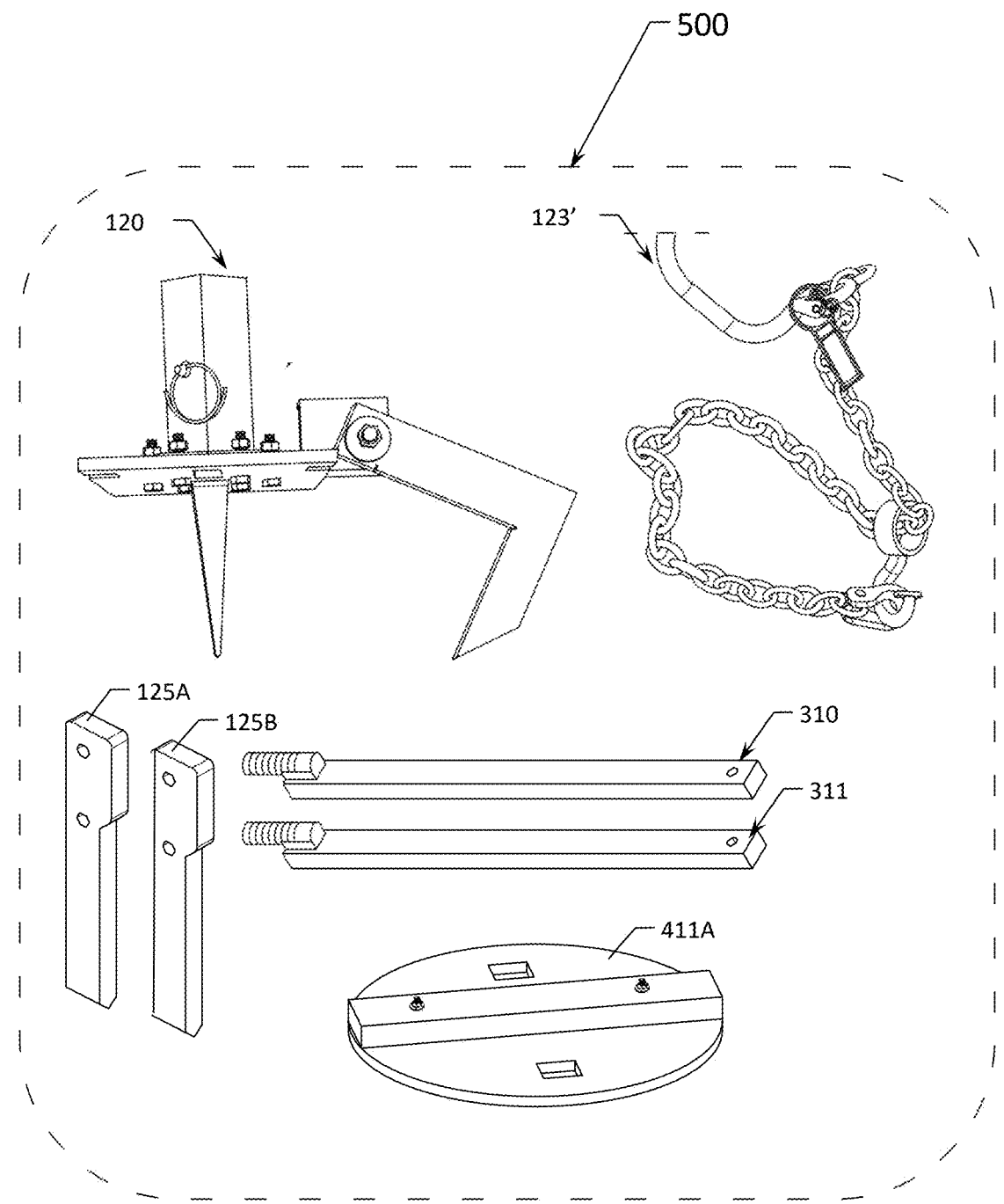
FIG. 5 is a schematic view of a kit 500, corresponding to one or more embodiments of the present invention.

FIG. 5 shows pole removal kit 500, which can stored in this disassembled form, and stored for usage when needed on a utility digger derrick truck, such as truck 110, equipped with a boom arm, auger drive motor, and drive shaft. Kit 500 includes pole coupling assembly 120 (or 620), pole choke chain 123", pole stakes 125A and 125B, vertical arms 310 and 311, and winder adapter plate 411A. Not shown but included in some embodiments are fasteners and pins described and/or shown, to realize assemblies 100, 300, 400, and 600, as desired.

Figure 6A:
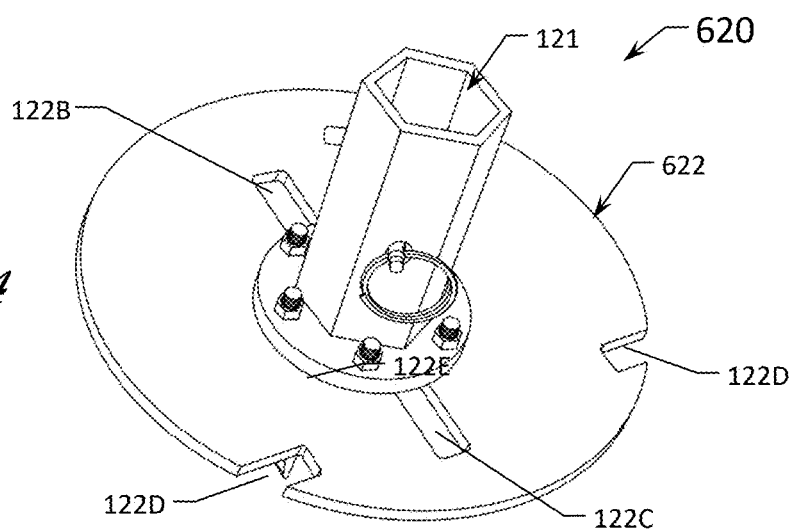
FIG. 6A is a top perspective view of an alternative pole butt coupling assembly for systems, such as system 100, corresponding to one or more embodiments of the invention.
Figure 6B:
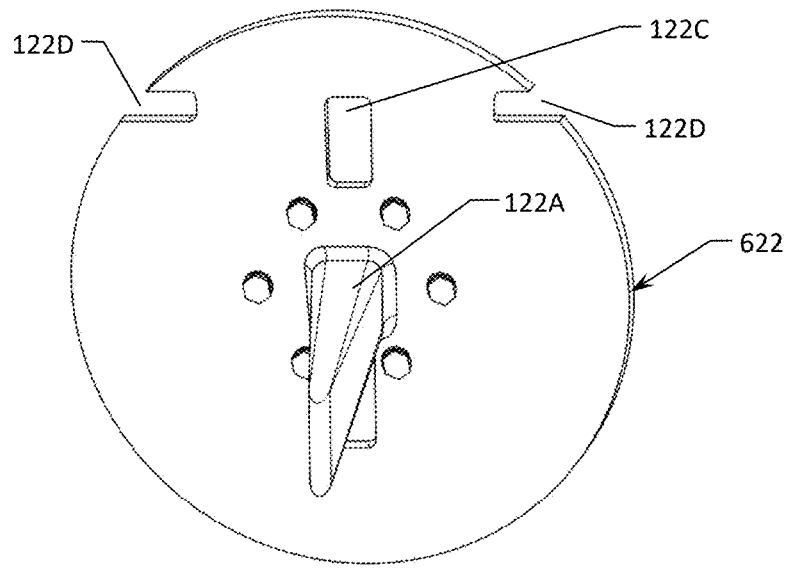
FIG. 6B is a bottom perspective view of the pole butt coupling assembly 620, corresponding to one or more embodiments of the invention.
Figure 6C:
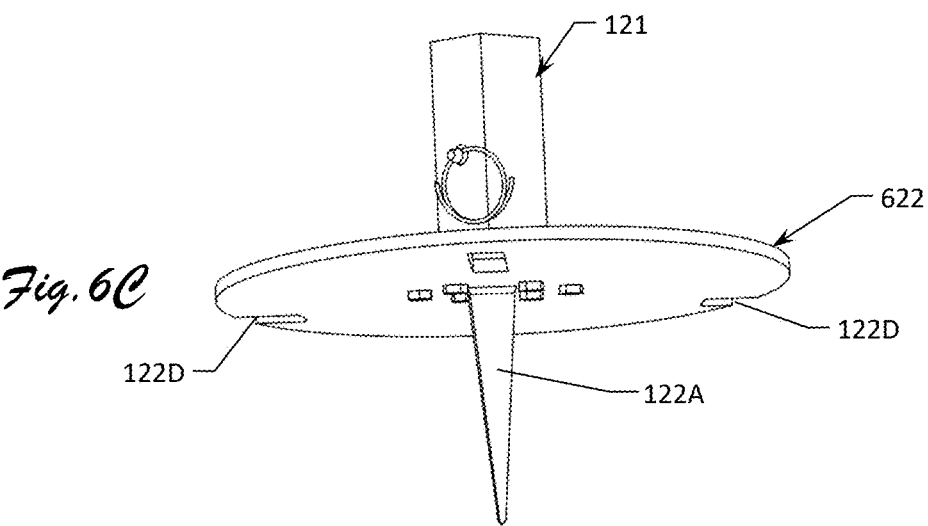
FIG. 6C is a left side view of the pole butt coupling assembly 620, corresponding to one or more embodiments of the invention.

FIGS. 6A, 6B, and 6C show a pole butt coupling assembly 620 for systems, such as system 100. Assembly 620, which is functionally similar to assembly 120, includes rotary drive coupler 121, a circular wedge or blade plate 622, giving it a distinct appearance relative to assembly 120. Wedge plate 622, like wedge plate 122, includes a set of one or more wedges or blades, for example wedge 122A, extending from its lower major surface, as well as blade or stake holes or slots 122A and 122B for pole stakes and notches 122D and 122E for linking with pole chain or collar 123. Some embodiments may also include a hook assembly, like assembly 120.

CONCLUSION

In the foregoing specification, specific exemplary embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms, such as second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the term "exemplary" is used as an adjective herein to modify one or more nouns, such as embodiment, system, method, device, and is meant to indicate specifically that the noun is provided as a non-limiting example.

What is claimed is:

1. An assembly configured for facilitating removal of an inground electric power utility pole or a portion thereof from supporting earth, the assembly comprising:

at least one choke chain configured to rotationally couple and encircle the inground utility pole or the portion thereof to receive torque about a longitudinal axis of the utility pole or the portion thereof;

a drive shaft coupled to a plate via a rotary drive coupler;

at least one axial penetration member and at least one radial penetration member coupled to the plate, for coupling the pole or the portion thereof to a lifting arm of a power utility truck, with the plate having one or more notches configured to engage with the at least one choke chain and allow concurrent lifting and rotation of the utility pole or the portion thereof.

2. The assembly of claim 1, wherein the at least one axial penetration member is configured to penetrate to a desired depth of at least one inch into the utility pole or the portion thereof.

3. The assembly of claim 2, wherein the at least one axial pole penetration member includes a wedge or a blade.

4. The assembly of claim 1, further comprising a rotary driver mounted to the power utility truck to produce the torque, and wherein the rotary drive coupler includes a Kelly bar adapter, the Kelly bar adapter is configured for connection to the rotary driver and further configured to transfer torque from the rotary driver to the pole or the portion thereof via the at least one axial penetration member and the at least one radial penetration member.

5. The assembly of claim 4, wherein the at least one pole penetration member is configured to penetrate to a desired depth of at least one inch into a radial exterior surface of the utility pole or the portion thereof.

6. The assembly of claim 4, wherein the at least one radial pole penetration member includes a wedge or a blade.

7. The assembly of claim 1, wherein the power utility truck is a digger derrick truck.

8. An assembly configured for facilitating removal of an inground electric power utility pole or a portion thereof, the assembly comprising:

a wedge plate assembly including a plate portion with top and bottom opposing surfaces, with at least one wedge or blade structure extending downwardly from the bottom surface and configured to drive into a top surface of the utility pole or the portion thereof, at least one radial penetration member configured to penetrate a side surface of the utility pole or the portion thereof, and an axial drive coupler extending upwardly from the top surface of the plate portion, with the plate portion further including one or more notches in a peripheral surface thereof;

a strap or a chain configured to encircle and cinch the utility pole or the portion thereof to the wedge plate assembly via engagement with the one or more notches;

a digger derrick truck having a boom arm and a rotary drive, with the boom arm rigged to the strap or the chain and at least partially supporting the rotary drive over the utility pole or the portion thereof, and with the rotary drive coupled to the axial drive coupler, wherein the strap or the chain is configured to transfer rotational torque from the rotary drive to the utility pole or the portion thereof;

wherein the boom arm is controllable to apply a lifting force to the utility pole or the portion thereof while the rotary drive is applying the rotational torque to the utility pole or the portion thereof.

9. The assembly of claim 8, wherein the plate portion is rectangular with beveled corners or circular for improved aesthetics and/or safety.

* * * * *